United States Patent [19]

Driggs

[11] Patent Number: 5,542,803
[45] Date of Patent: Aug. 6, 1996

[54] BALE PICKER AND STACKER

[76] Inventor: Leland W. Driggs, 2547 Burma Rd., Eureka, Mont. 59917

[21] Appl. No.: 435,831

[22] Filed: May 5, 1995

[51] Int. Cl.⁶ .................................................. B65G 67/00
[52] U.S. Cl. ........................... 414/111; 414/24.5; 414/477
[58] Field of Search ................................... 414/24.5, 111, 414/789.7, 477, 478, 479, 480, 489, 492, 493, 546, 549; 180/89.13, 326, 327, 329

[56] References Cited

U.S. PATENT DOCUMENTS

| | | | |
|---|---|---|---|
| 3,195,913 | 7/1965 | Hallsworth | 180/329 |
| 3,233,765 | 2/1966 | Barnes . | |
| 3,376,987 | 4/1968 | Lohse | 414/477 |
| 3,398,984 | 8/1968 | Ajero | 180/89.13 |
| 3,595,409 | 7/1971 | Bowman-Shaw | 180/89.13 |
| 3,826,389 | 7/1974 | Godfrey et al. . | |
| 3,942,651 | 3/1976 | Neely, Jr. . | |
| 4,008,818 | 2/1977 | Neely, Jr. . | |
| 4,249,843 | 2/1981 | Kerr | 414/492 |
| 4,329,101 | 5/1982 | Green et al. | 414/24.5 |
| 4,426,183 | 1/1984 | Butler | 414/111 |
| 4,427,090 | 1/1984 | Fredriksen et al. | 180/327 |
| 4,619,570 | 10/1986 | Siebenga | 414/39 |
| 4,971,504 | 11/1990 | Klompien | 414/111 |
| 5,211,345 | 5/1993 | Siebenga | 241/101.7 |
| 5,236,294 | 8/1993 | Willis | 414/24.5 |
| 5,333,981 | 8/1994 | Pronovost et al. | 414/24.5 |
| 5,405,229 | 4/1995 | Tilley et al. | 414/111 |

FOREIGN PATENT DOCUMENTS

| | | | |
|---|---|---|---|
| 1011297 | 2/1975 | Canada . | |
| 1201690 | 3/1986 | Canada | 414/24.5 |
| 2560488 | 3/1984 | France . | |

OTHER PUBLICATIONS

J. A. Freeman & Son, Inc. brochure, "Freeman Big Bale Roadsider," on sale before May 5, 1994.

Primary Examiner—Karen B. Merritt
Assistant Examiner—Douglas Hess
Attorney, Agent, or Firm—Wells, St. John, Roberts, Gregory & Matkin P.S.

[57] ABSTRACT

A bale picker and stacker is described, including a control cab on a primary frame. The control cab and a steering controller are mounted to the primary frame for movement between a forward position at the frame front end and a rearward position outwardly along side the frame and adjacent the rearward frame end. A steering reverser is connected to the steering controller for reversing steering operation at the forward or rearward positions of the control cab. A lifting bed on the primary frame includes a top bale receiving surface moves between substantially horizontal and vertical positions. A bale pick-up on the lifting bed, includes a leg section and an outwardly projecting platform section. The bale pick-up moves between (a) a first position with the platform section adjacent the ground surface and parallel to the top bale receiving surface of the lifting bed, (b) a second position wherein the platform section is substantially perpendicular to the top bale receiving surface and disposed toward the rear end of the primary frame, and (c) a third position wherein the platform section is substantially perpendicular to the top bale receiving surface and disposed toward the front end of the primary frame from the second position. A bale squeezing frame is mounted to the lifting bed opposite to the bale pick-up and is movable toward the bale pick-up.

28 Claims, 13 Drawing Sheets

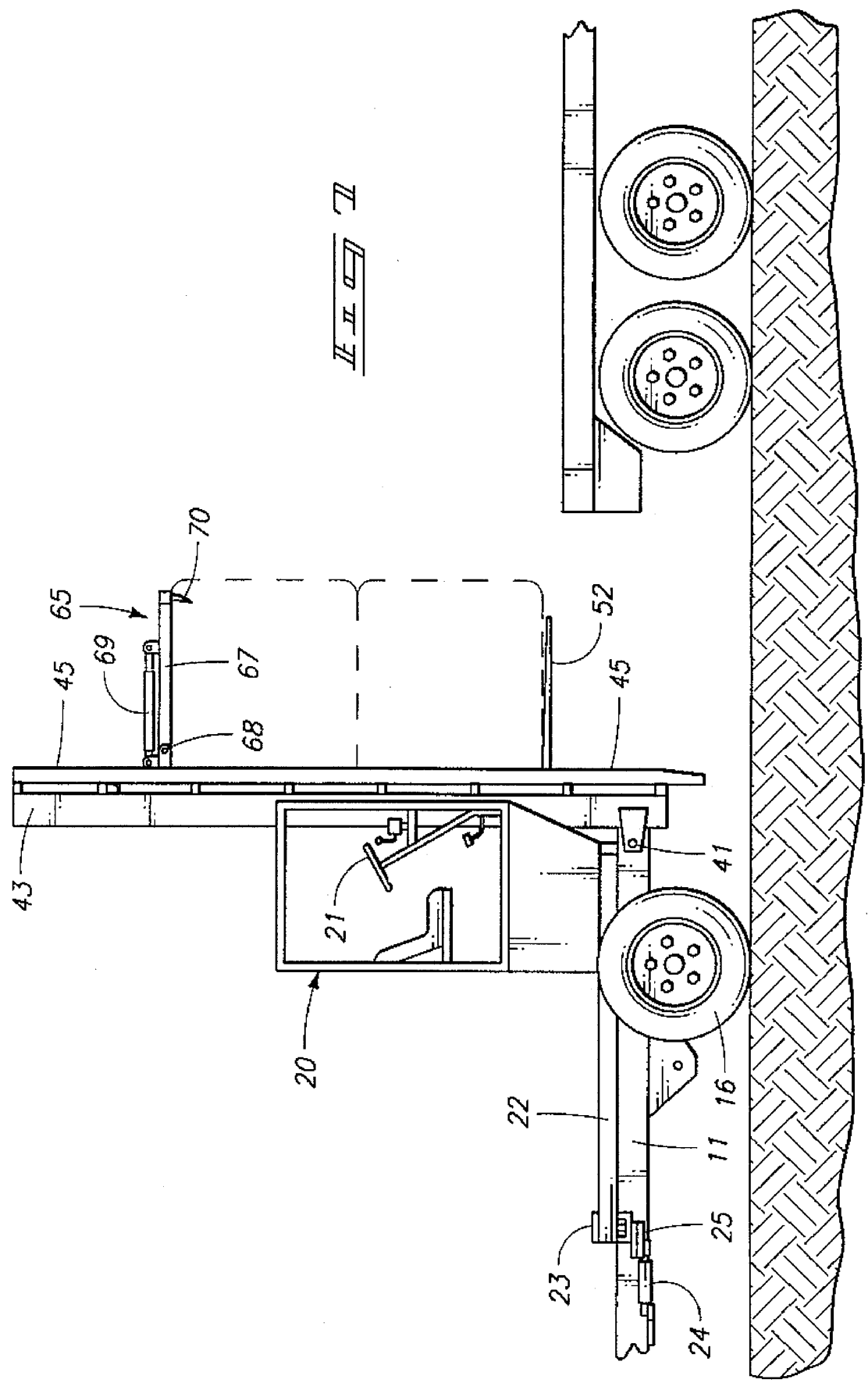

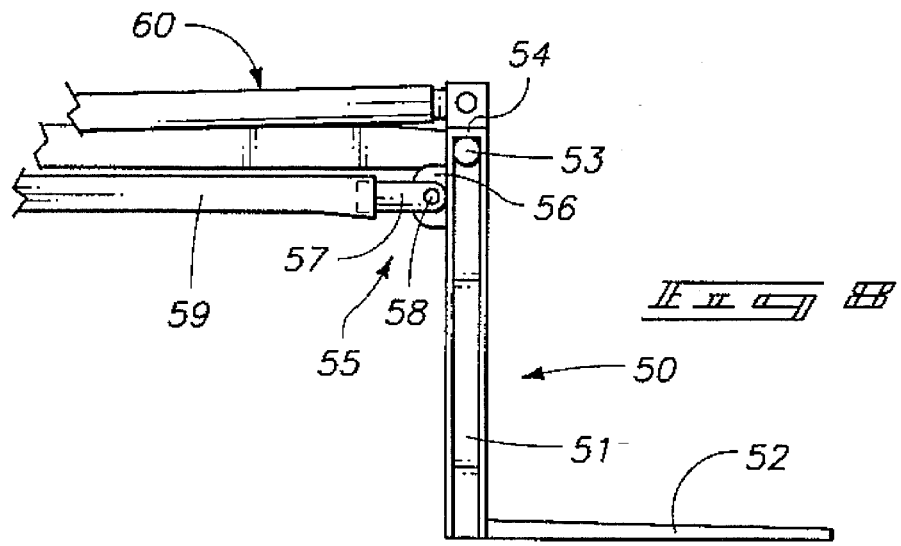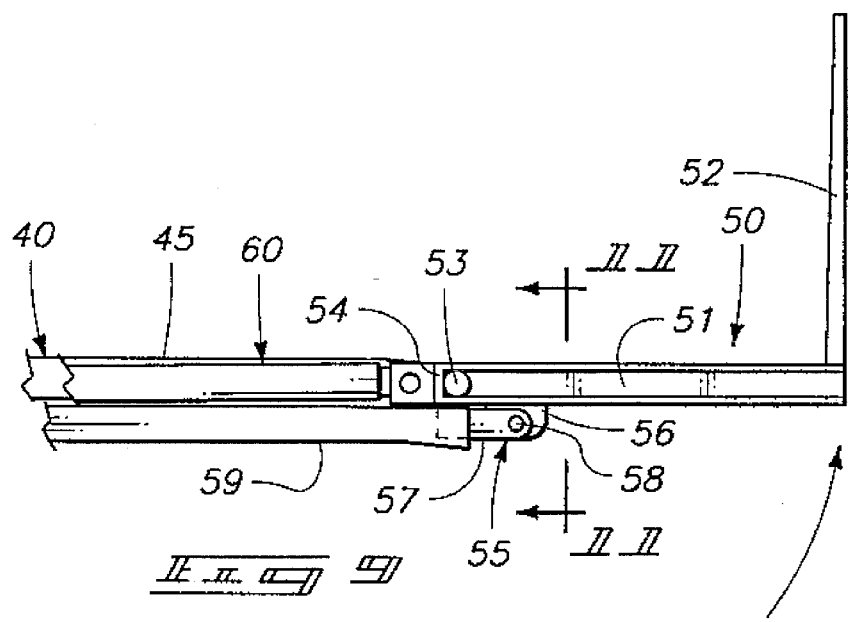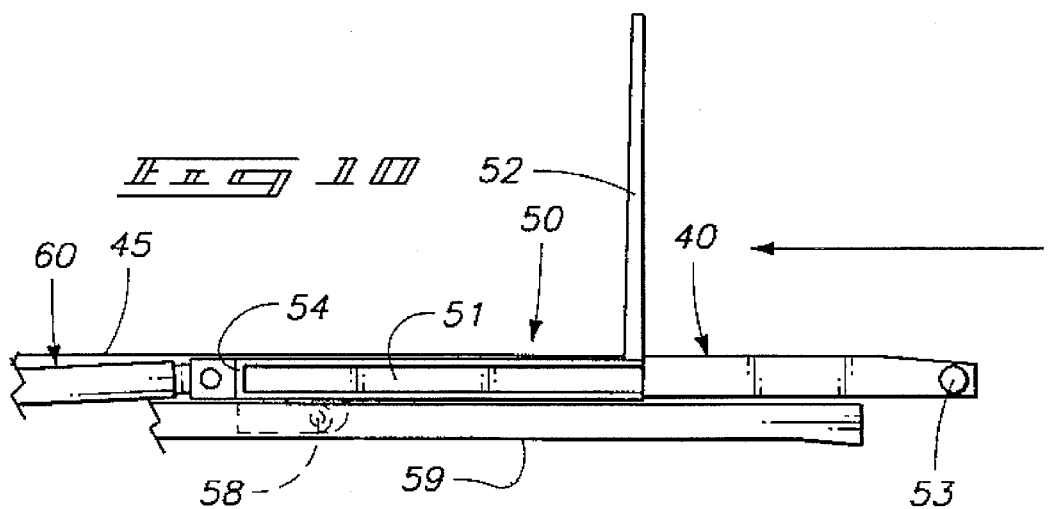

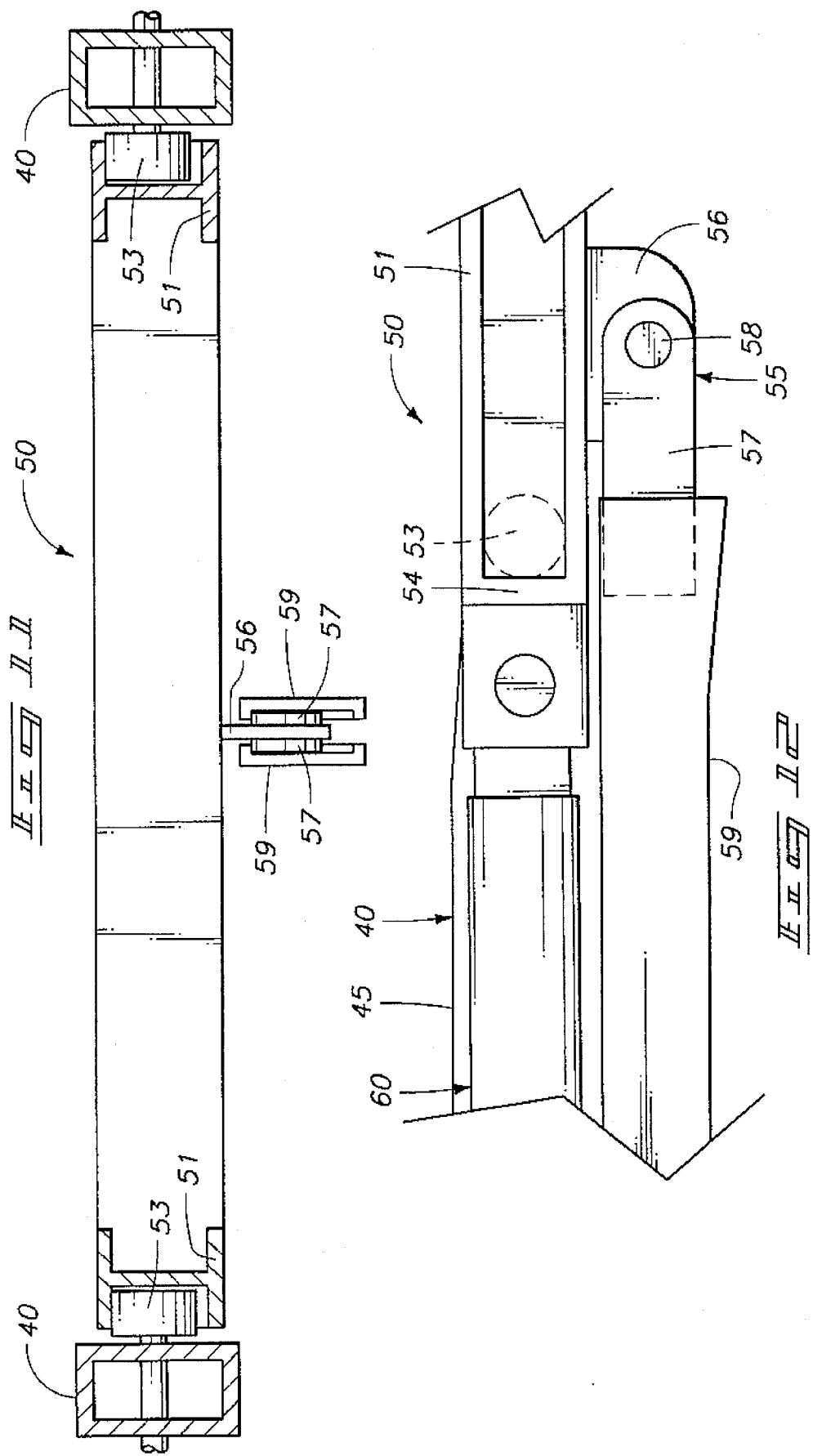

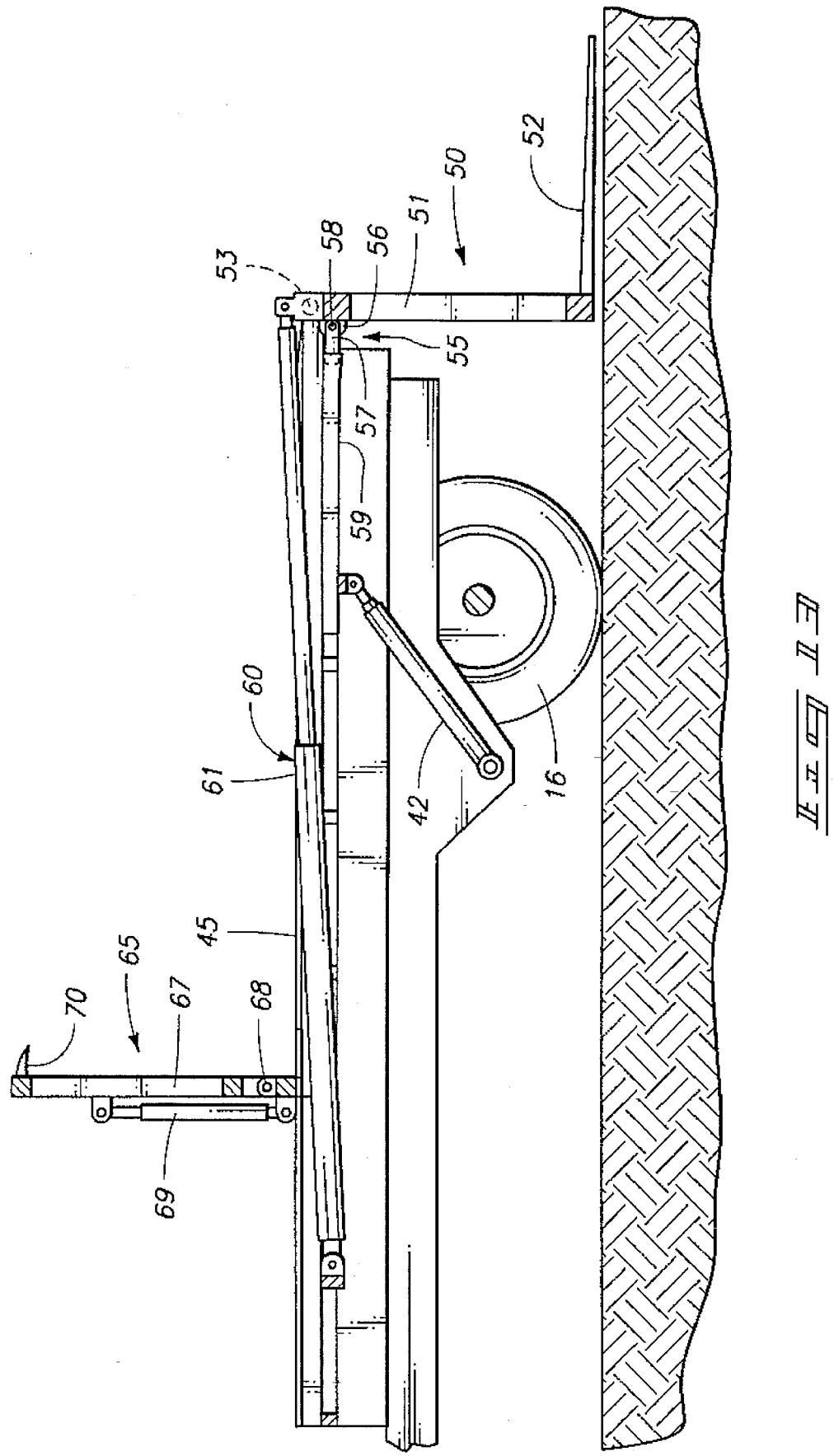

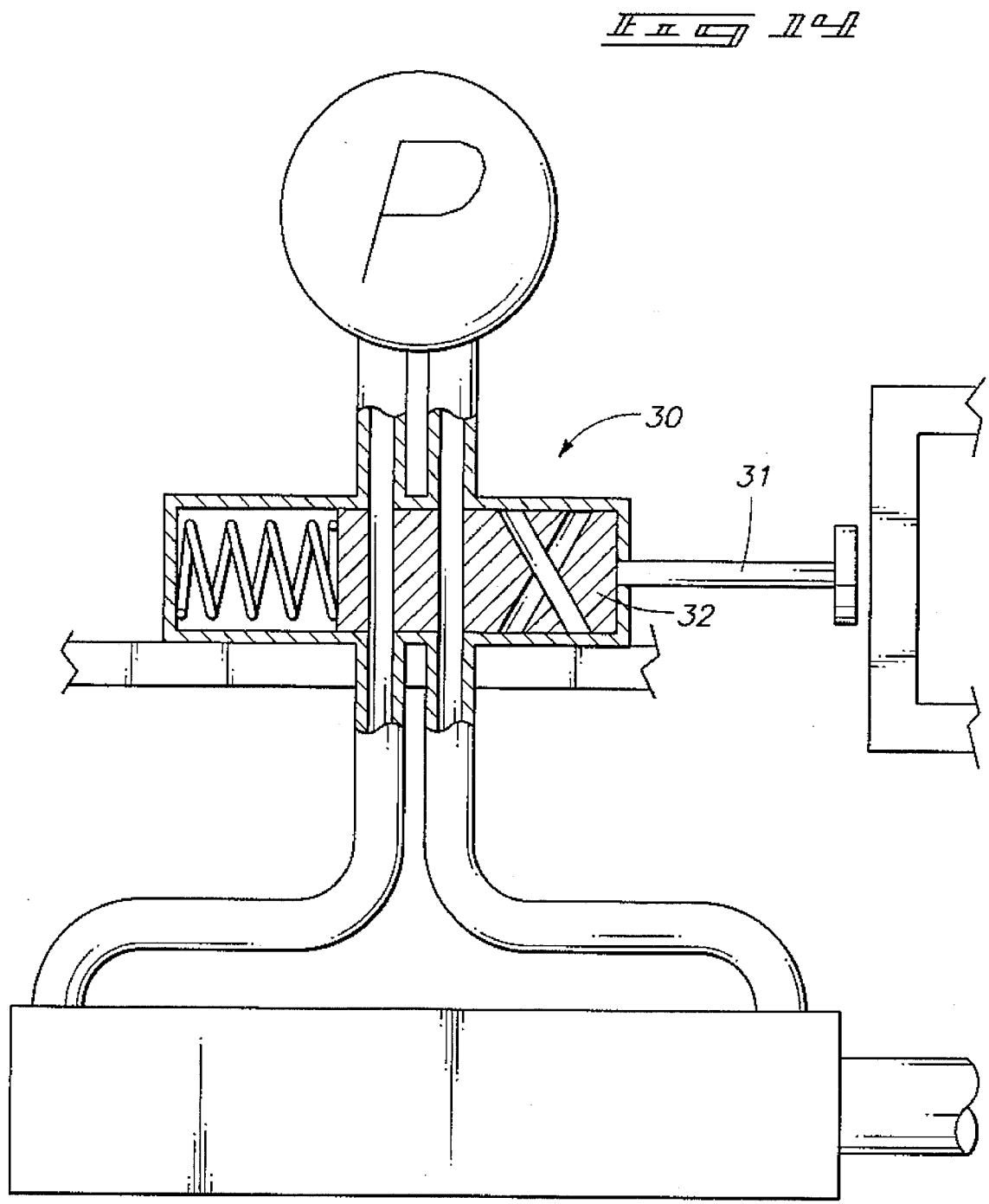

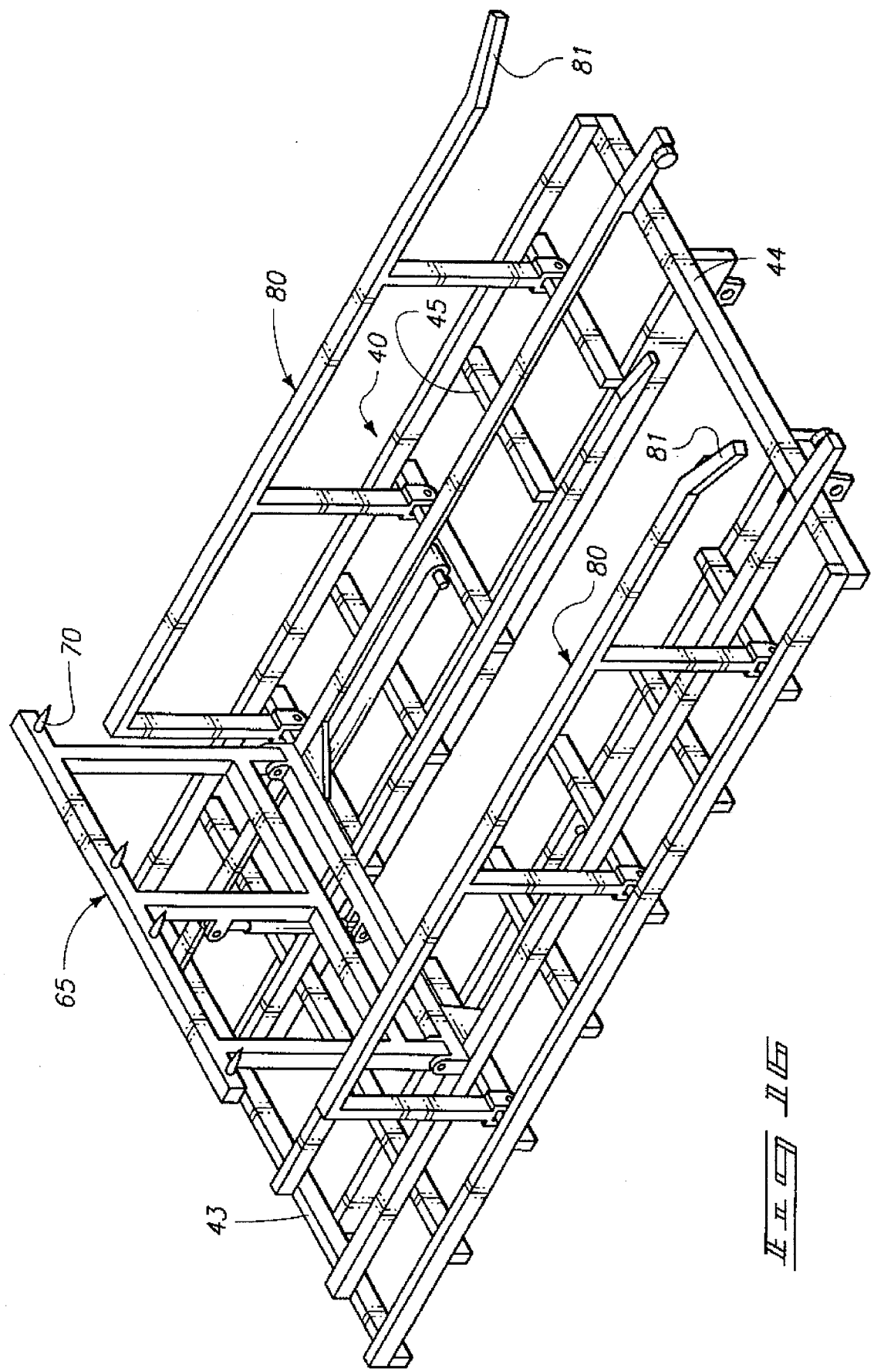

5,542,803

BALE PICKER AND STACKER

TECHNICAL FIELD

The present invention relates to gathering and stacking of bales, particularly bales of material such as hay.

BACKGROUND OF THE INVENTION

It is becoming more popular to bale materials such as hay, in large rectangular or round bales. Such bales, some of which are approximately four feet across, four feet high, and eight feet long often weigh approximately one ton each. Such large scale bales reduce the field time previously required to produce smaller bales, and the amount of handling for the individual bales. The larger bales are much too heavy to permit manual gathering and stacking, and so require additional motorized equipment to accomplish these tasks.

Numerous bale picking and stacking devices have been developed in the past for handling large bales. However, problems have been realized with their use. Some are designed as tractor drawn carts with mechanisms attached for handling the bales. While somewhat serviceable, the carts are not easily maneuvered, especially when the bales are to be stacked.

Other pickers and stackers are designed as complete self powered vehicles. In these, the operator's cab is usually situated at one end of the machine, alongside the picking and stacking head. Such machines are difficult to maneuver in close areas due to their necessary width dimensions.

To alleviate this problem, bale lifts have been designed to hoist the bales over the cabs. This eliminates the width problem, but creates problems when the accumulated bales are to be deposited in a stack. The entire stack cannot be easily lifted back over the cab. Thus such stackers often stack from the rear, at a considerable distance from the operator's cab. This creates difficulty for the operator who is unable to clearly see to properly position the vehicle in relation to the stack where the bales are to be deposited. Tractor drawn stackers suffer from this positioning problem as well.

A need is thus seen for a stacker with a movable cab that will permit the operator to shift the position of the cab from a forward position, narrowing the vehicle width for travel and close maneuvering, to a rearward position alongside the gathering and stacking components to facilitate accuracy in maneuvering during gathering and stacking operations.

Another problem is realized with the bale gathering and stacking machinery itself. Some such apparatus are designed specifically to pick bales from the ground surface and deposit the accumulated bales as a stack back onto the ground surface. There is no provision for depositing the gathered bales on, say, the bed of a truck at an elevation well above the ground surface.

A need is thus also realized for a picking and stacking machine that will stack on the ground or on an elevated surface such as a truck bed.

The above needs are answered by the present invention, a preferred form of which is described in detail below, with reference to the accompanying drawings.

BRIEF DESCRIPTION OF THE DRAWINGS

Preferred embodiments of the invention are described below with reference to the accompanying drawings, which are briefly described below.

FIG. 7 is a fragmented view showing positions of the lifting bed and bale pick-up for depositing bales on a truck bed;

FIG. 8 is a fragmented view showing the pick-up in the first position;

FIG. 9 is a fragmented view showing the pick-up in the second position;

FIG. 10 is a fragmented view showing the pick-up in the third position;

FIG. 11 is an enlarged sectional view taken along line 11—11 in FIG. 9;

FIG. 12 is an enlarged fragmented view of a preferred pivot control for the present invention;

FIG. 13 is a longitudinal sectional view taken along line 13—13 in FIG. 3 through the lifting bed to show bale pick-up and lifting bed drives;

FIG. 14 is a schematic view of a steering controller for the present invention;

FIG. 16 is a fragmented perspective view of the lifting bed with racks mounted thereon for receiving and securing round bales.

DETAILED DESCRIPTION OF THE PREFERRED EMBODIMENTS

Figure 1:
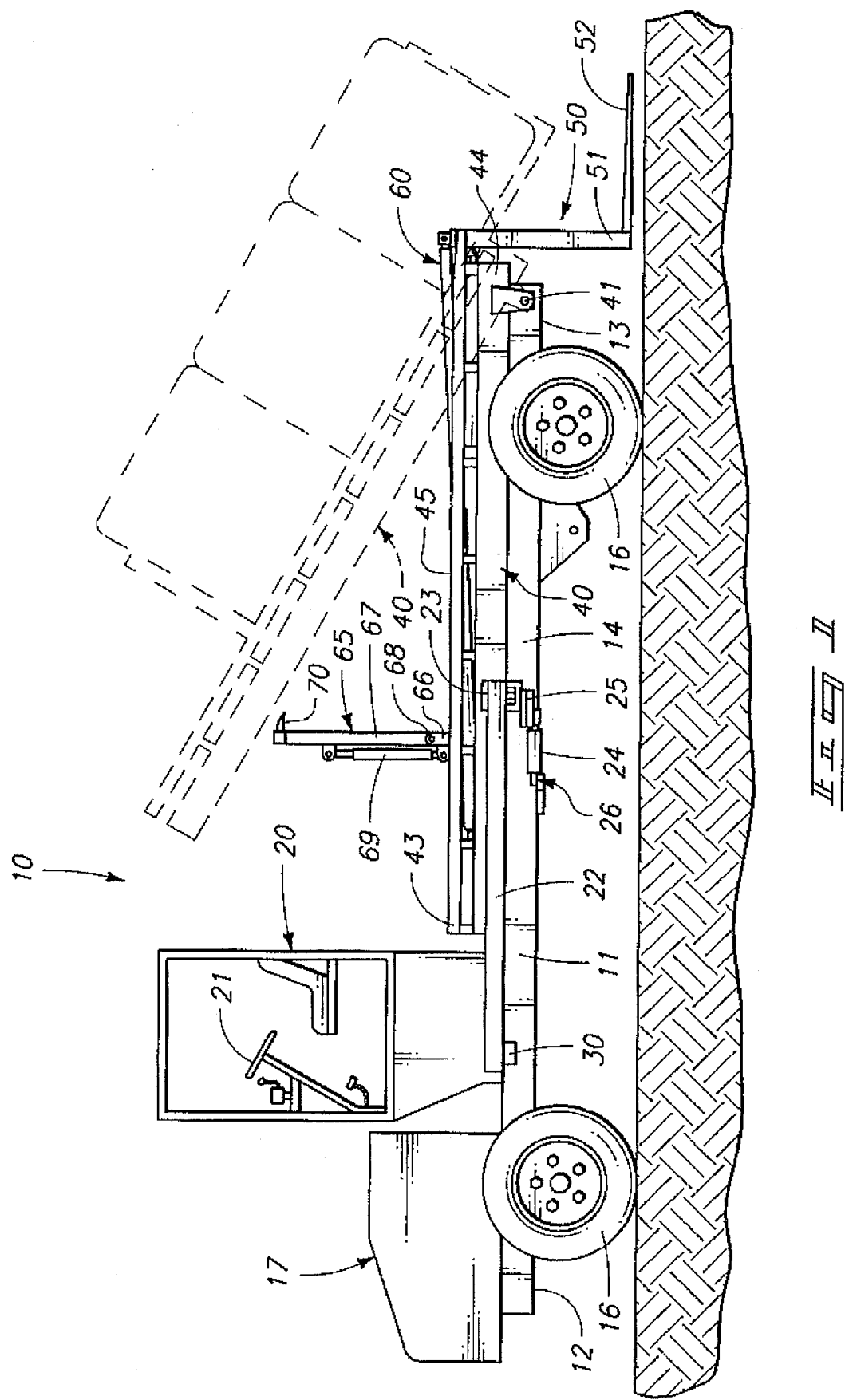
FIG. 1 is a side elevation view of a first preferred form of the present invention with the lifting bed and three collected bales shown partially hoisted in dashed lines.

This disclosure of the invention is submitted in furtherance of the constitutional purposes of the U.S. Patent Laws "to promote the progress of science and useful arts" (Article 1, Section 8).

A preferred form of bale picking and stacking vehicle is designated in the drawings by the reference numeral 10. The vehicle is intended for use in picking baled hay or other baled product from a field, arranging the bales in a horizontal stack, and then depositing the bales in a vertical stack at a distant location. The vehicle may also be operated to pick up vertical stacks of bales and to move the stack to another location.

In general, the present vehicle 10 includes a primary frame 11, including a front end 12 and a rearward end 13. Side edges 14, 15 join the front and rearward ends 12, 13. The primary frame 11 is constructed of rigid steel frame members in a manner known in the vehicle art.

Wheels 16 on a conventional undercarriage movably support the primary frame 11 for movement along a ground surface. At least two of the wheels are steerable, using conventional steering mechanisms (not shown) well known in the vehicle art. It is preferred that the steerable wheels be situated at the front end 12 of the primary frame 11, and that the driving wheels be situated at the rearward end 13.

A drive train 17 is mounted to the primary frame 11 and is connected to driven wheels by conventional fully reversible drive components. The drive train 17 powers at least two of the wheels to move the vehicle along the ground surface.

A control cab 20 is mounted on the primary frame 11 for supporting an operator. In a preferred form the cab 20 includes a steering controller 21 for operating the steering wheels to control directional movement of the vehicle, as well as other appropriate control apparatus for allowing selective operation of the vehicle 10 from the cab 20.

The control cab 20 is mounted by a pivot frame 22 to the primary frame 11 for movement between a forward position (FIG. 1) at the front end of the primary frame between the side edges 14, 15 and a rearward position (FIG. 4) outwardly of and along side one of the side edges 14, 15 adjacent the rearward end 13 of the frame 11.

The pivot frame 22 is elongated, mounting the cab 20 at an outward end thereof. The opposed inward end is mounted to the primary frame 11 by means of a pivot bearing 23. The bearing 23 pivotably mounts the cab 20 and pivot frame to the vehicle frame 11 for swinging movement about a substantially vertical axis and through an arc of approximately 180°. A pivot driver 26, preferably including a cylinder 24 and linkage assembly 25, is provided between the pivot frame 22 and primary frame 11, for selective actuation to swing the cab and pivot frame between the two positions.

Figure 5:
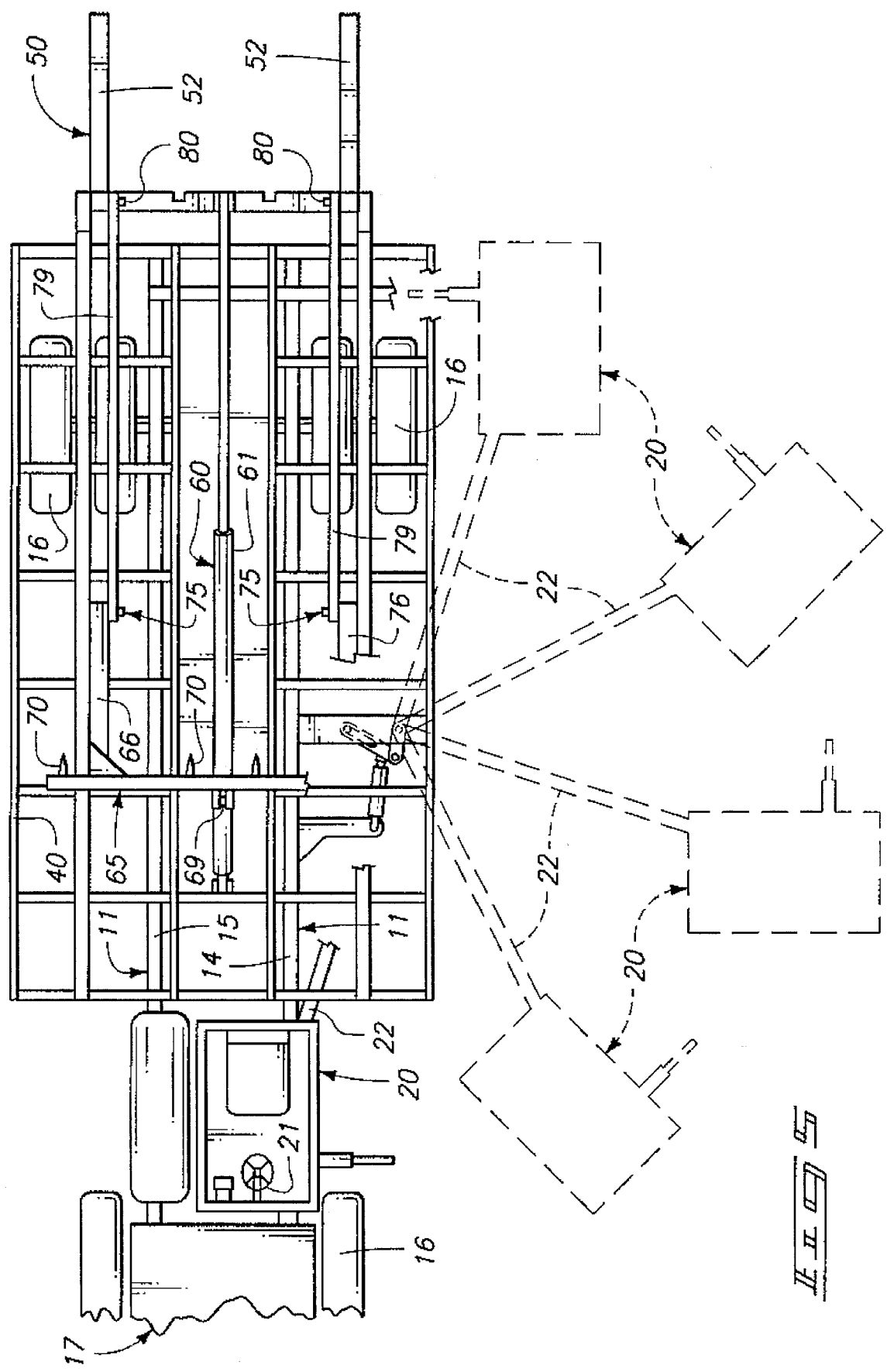
FIG. 5 is a top view showing movement, using dashed lines, of the cab between forward and rearward positions.

The cab 20 will swing through the arc (FIG. 5) from a position at the front end 12 of the primary frame 11, between the side edges 14, 15; to a position adjacent the rearward frame end 13, along side one of the side edges 14, 15. The cab 20, in the forward position, is thus located within the frame width to facilitate movement of the vehicle through confined spaces such as gateways, bridges, etc. In the rearward cab position, the operator is situated facing rearwardly and in clear view of the bale pick-up 50 (described in greater detail below) to best view and control bale retrieval and stacking operations.

It is pointed out that because the cab swings through an arc of approximately 180°, there is no need to rotatably mount the cab to the pivot frame 22. This eliminates complicated pivot and control connections found in rotatable cab arrangements.

Steering controller 21 may be a conventional hydraulic steering mechanism found on conventional vehicles. However, in the preferred form, a steering reverser 30 (FIG. 14) is provided, to enable normal steering of the vehicle regardless of the cab position. Without this provision, the vehicle operator would be required to remember the steering effects will reverse with shifting of the cab. For example, to turn left with the cab in the forward position, the operator may simply turn the controller 21 left. However, when the cab is shifted rearwardly, turning effects reverse; so the operator would then be required to turn the controller right to steer the vehicle to the left. This would be difficult for the operator to remember.

The reverser 30 includes a reverse flow valve 32 (FIG. 14), allowing flow of hydraulic steering fluid in one path when the cab is facing forwardly, and in a reversed path when the cab is facing rearwardly. The valve 32 includes an actuator 31 that is mounted to the primary frame to be engaged as the cab swings into position. In one preferred form, the valve actuator is biased to one position and may be operated by engagement with the cab to reverse flow as the cab reaches the forward position.

Figure 4:
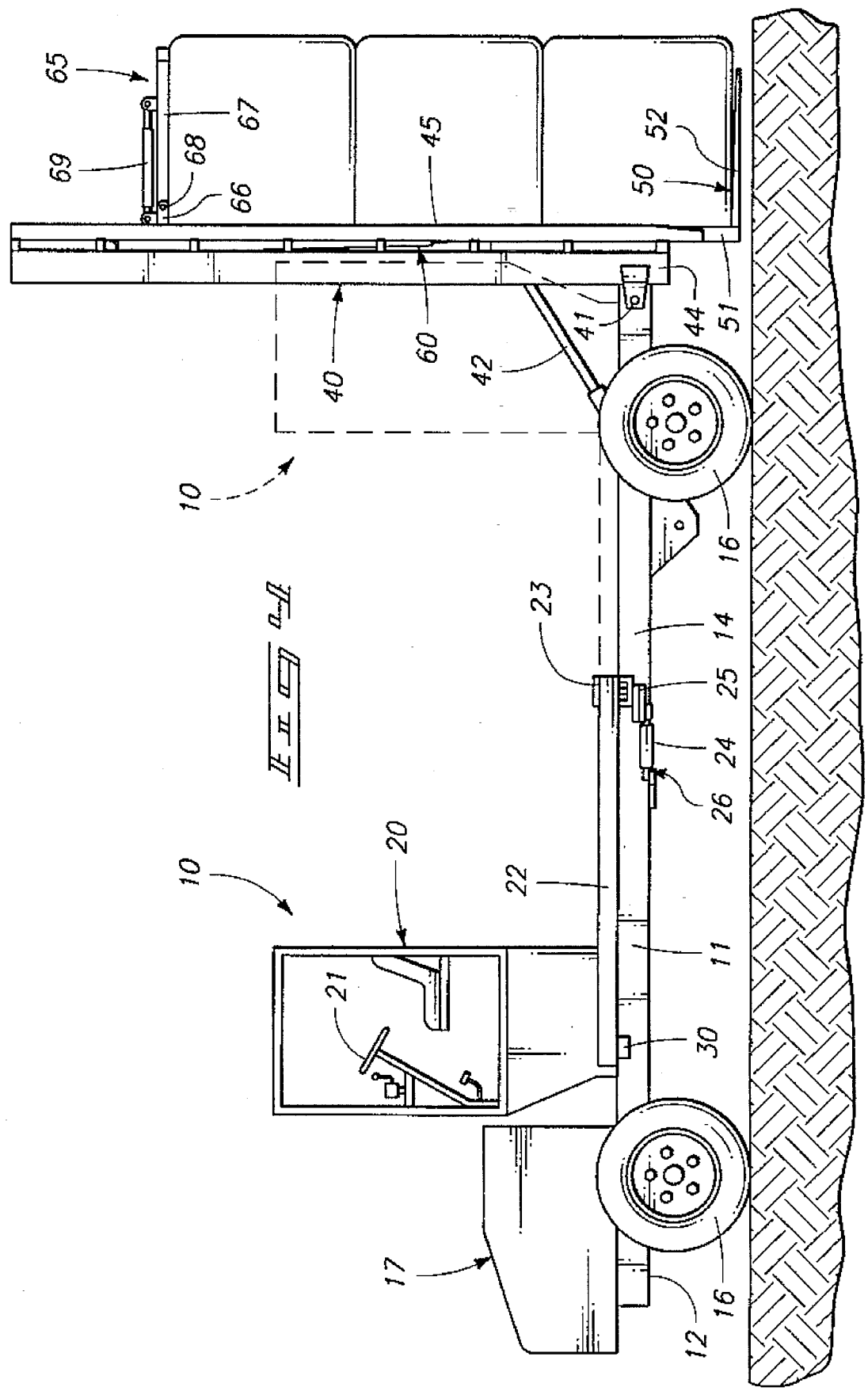
FIG. 4 is a side elevation view with the cab shown in solid lines in its forward position and in dashed lines in its rearward position, and the lifting bed in an approximately vertical position.

A lifting bed 40 is mounted on the primary frame 11. Bed 40 is mounted to the primary frame for movement between a substantially horizontal position (FIG. 2) and a substantially vertical position (FIG. 4). In a preferred form, the bed 40 is mounted to the primary frame by a pivot 41 situated adjacent the rearward frame end 13. The pivot is transverse to the frame and defines a horizontal, transverse pivot axis.

A lift drive 42 is mounted between the lifting bed 40 and primary frame 11 for selectively moving the lifting bed 40 between the substantially horizontal and vertical positions. In a preferred form, the lift drive 42 is a hydraulic cylinder, connected in a conventional hydraulic circuit (not shown) controlled from the cab 20 to extend and retract and thereby lift and lower the lifting bed.

Lifting bed 40 is rigid and is formed of steel, like the primary frame 11. Bed 40 includes a top bale receiving surface 45 that is relatively flat to receive and support a selected number of bales. The surface 45 extends from a forward bed end 43 to a rear bed end 44. The ends 43, 44 are situated adjacent respective forward and rearward ends 12, 13 of the primary frame when the lifting bed is in the horizontal position.

The bale pick-up 50 is movably mounted to the lifting bed 40, preferably at the rearward end 44, for engaging and lifting bales to and from the lifting bed. The bale pick-up 50 in a preferred form is substantially "L" shaped, with parallel leg sections 51 rigidly mounting an outwardly projecting platform section 52.

The pick-up is moveable on the lifting bed 40 between:

(a) a first position (FIGS. 1, 8) wherein the platform section 52 is substantially parallel to and offset toward the ground surface from the top bale receiving surface 45 of the lifting bed;

(b) a second position (FIG. 9) wherein the platform section 52 is substantially perpendicular to the top bale receiving surface 45 and disposed toward the rear end of the primary frame; and (c) a third position (FIG. 10) wherein the platform section 52 is substantially perpendicular to the top bale receiving surface 45 and is disposed toward the forward end 43 of the lifting bed 40 from the second position.

To facilitate the above positioning, the leg sections of the bale pick-up are mounted by rollers 53 (FIGS. 11, 12) on the lifting bed. The rollers 53 are rotatably mounted to the lifting bed 40 on a fixed transverse axis. The rollers 53 are received within channels formed in the leg sections 51.

The leg sections 51 move longitudinally over the rollers 53, pivoting on the roller axis, and moving longitudinally along the channel lengths. Such movement is effected by a bale pick-up driver 60 (FIG. 13) mounted between the bale pick-up 50 and lifting bed 40.

The driver 60 is advantageously provided as a hydraulic cylinder 61, connected in a hydraulic circuit of conventional design and controlled by appropriate conventional valving from the cab 20. One end of the cylinder 61 is pivotably mounted to the lifting bed 40, the other end to the bale pick-up 50 on a side of the roller axis in opposition to the platform section 52.

Extension of the cylinder 61 will cause the bale pick-up to move rearwardly over the rollers 53 and swing downwardly as its weight becomes cantilevered rearwardly from the roller axis. The bale pick-up will continue swinging downwardly until stops 54 within the leg channels come into abutment with the rollers 53. The platform section 52 is now substantially parallel and adjacent to the ground surface. This is the bale engaging position (FIG. 8).

Retraction of the cylinder 61 will cause the bale pick-up 50 to swing over the rollers 53, with the platform section 52 swinging upwardly. To prevent the leg sections from simply "climbing" the rollers and subsequently dropping downwardly, a pivot control 55 (FIGS. 11, 12) is mounted between the lifting bed 40 and bale pick-up 50.

The pivot control 55 confines movement of the leg sections 51 about the axis defined by rollers 53 between the first and second positions. The control 55 also permits substantially linear movement of the platform and leg sections between the second and third positions.

The pivot control 55, in a preferred form, includes a bracket 56 secured to the bale pick-up 50. A pair of pivot guides 57 are connected by a pivot pin 58 to the bracket 56. The pivot guides 57, in turn, are slidably carried in a slotted, rearwardly flared guideway 59 secured to the lifting bed and parallel to the top surface 45.

The guides 57 will slide freely along the guideway 59, holding the leg sections 51 parallel to the top surface 45 between the second and third positions of the bale pick-up in response to extension and retraction of the cylinder 61. The flared end of the guideway will allow slight up and downward shifting of the guides 57, controlling the swinging motion of the bale pick-up as it moves over the rollers between the first and second positions.

The distance travelled by the bale pick-up between the second and third positions is determined by the stroke length of cylinder 61, and the corresponding length of the guideway 59. It is preferred that this dimension be sufficient to position the bale pick-up to hold a stack of bales on the lifting bed (when the lifting bed is pivoted vertically as shown in FIG. 7) to enable loading of the stack onto a flatbed truck.

A bale squeezing frame 65 is movably mounted to the lifting bed toward the forward end 43, in opposition to the bale pick-up 50. The bale squeezing frame is movable to clamp one or more bales against the bale pickup 50. This feature allows the bale or bales to be held securely on the lifting bed 40 while the bed is raised or lowered.

The squeezing frame 65 includes a base section 66 movably mounted to the lifting bed, and an upright abutment 67 attached to the base section 66 by pivot pins 68. The pins are part of a tilting mechanism allow the abutment 67 to be tilted toward and away from the bale pick-up 50 at the opposite end of the lifting bed 40.

The tilting mechanism also includes a cylinder 69, mounted between the base section 66 and abutment 67. The cylinder 69 is connected in the typical hydraulic circuit and may be controlled from the cab 20 to selectively extend and retract, causing the abutment to pivot about the pins 68.

Bale engaging spikes 70 are provided on the abutment 67, projecting from the squeezing frame toward the bale pick-up. The spikes are used to engage the top bale of the stack as the tilting mechanism is operated to pivot the abutment against the bale. The spikes prevent the top bale and the stack below from prematurely tipping away from the lifting bed during stacking procedures.

An adjustment 75 is provided in a preferred form of the present vehicle, mounting the bale squeezing frame 65 to the lifting bed 40 for selective positioning along the bed 40 in relation to the bale pick-up. The adjustment includes a pair of bars 76 secured to the base section 65 of the squeezing frame 65, extending rearwardly along longitudinal side members of the lifting bed. The bars 76 are adjustably connected to a pair of links 79 that, in turn, are connected to the pick-up 50. The links include spaced holes 77. Positioning pins 78 are received through selected ones of the holes, to adjustably position the squeeze frame along the length of the lift bed. The links are connected at their rearward ends to the pick-up 50, so horizontal movement of the pick-up 50 will cause corresponding horizontal movement of the squeeze frame. This permits continuous gripping of the stack while shifting the stack position on the lift frame.

The pins 78 are removable to allow the squeezing frame 65 to be adjusted longitudinally along the lifting bed 40, and can be replaced in selected holes 77 as they come into alignment with holes 78 formed in the side members of the lifting bed 40. Spacing between successive pins preferably corresponds with the width dimension of bales to be received on the bed, so the distance between the squeezing frame 65 and bale pick-up 50 can be adjusted for a desired number of bales.

FIG. 16 illustrates the present lift frame with round bale racks 80 releasably mounted thereon. The round bale racks 80 may be adjustably mounted on frame 40 toward or away from one another to accommodate different size bales or bale orientation. The racks 80 are flared outwardly at 81 adjacent the bale pick-up 50 to guide received bales onto the lift frame from the leg and platform sections 51, 52.

Figure 2:
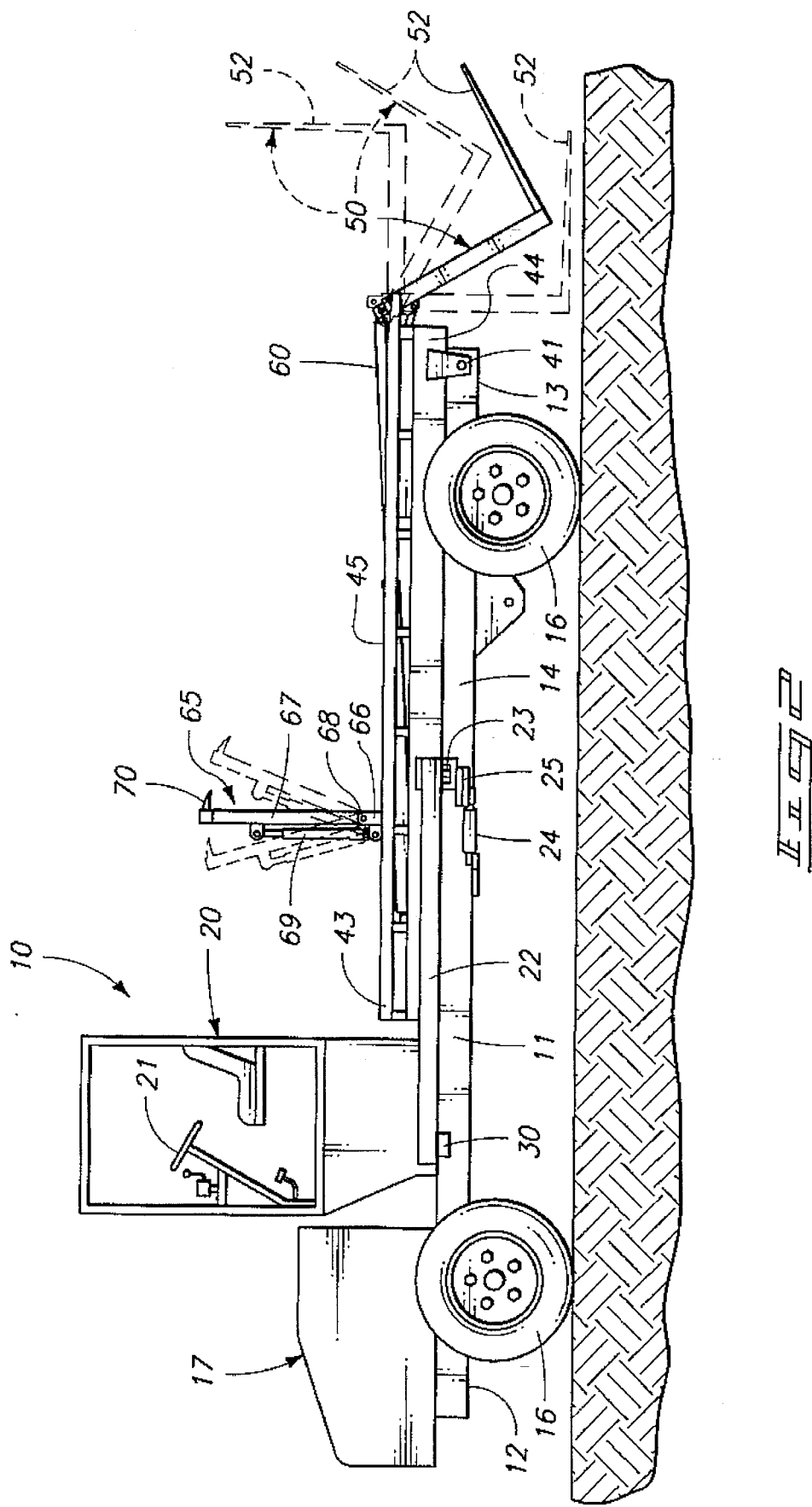
FIG. 2 is a view similar to FIG. 1 only showing the bale pick-up and squeeze frame in dashed, shifted positions.
Figure 3:
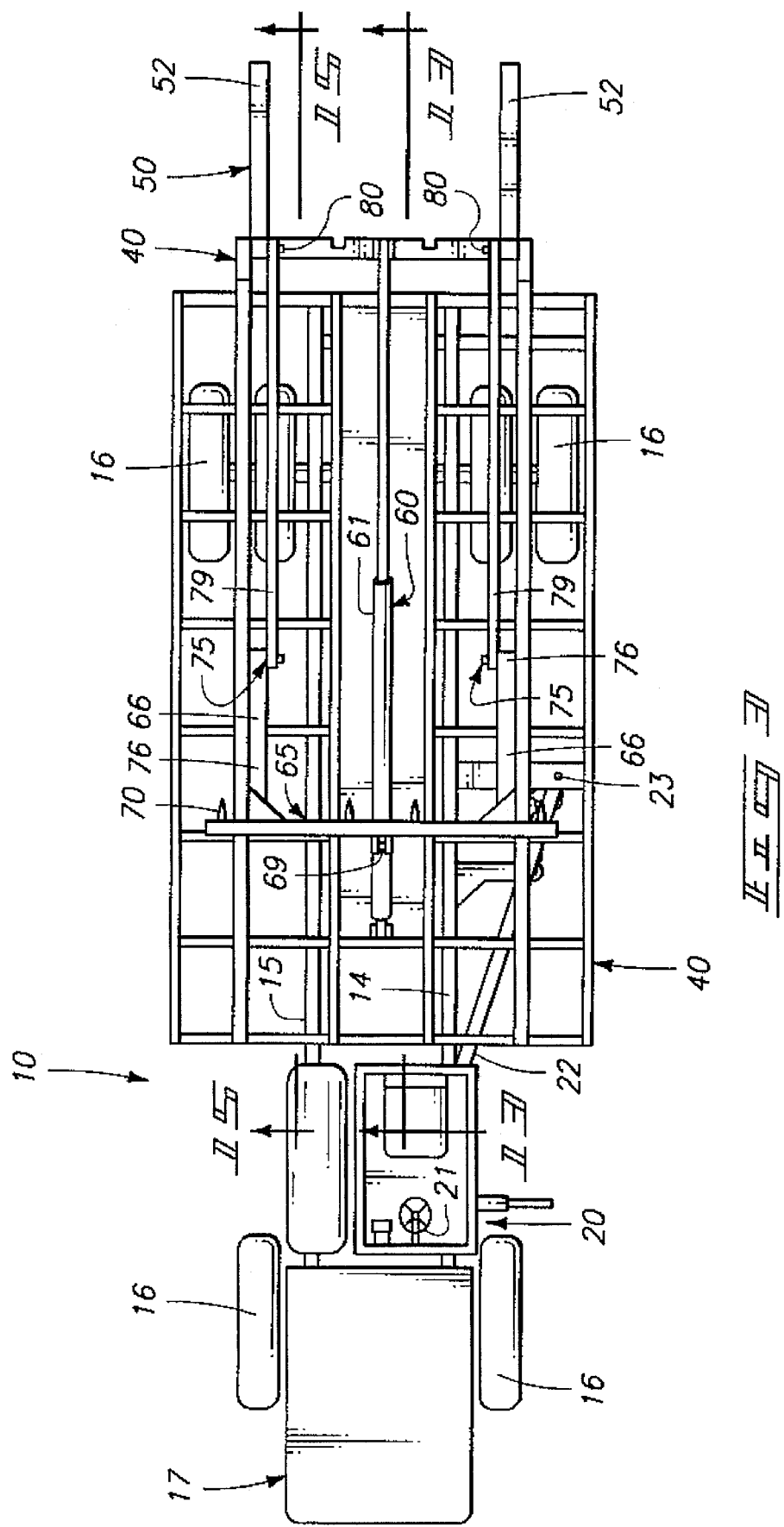
FIG. 3 is a top view with the cab in a forward position.

Given the above description of the invention, operation may now be easily understood. For convenience, description will be provided in conjunction with a round or rectangular hay bale picking and stacking operation, though other operations and uses are also envisioned for picking and stacking other baled materials (cotton, for example). For purposes of this description, operational description will begin with the vehicle in an empty condition with the cab in the forward position as shown in FIG. 2.

The operator may first elect to adjust the squeezing frame 65 along the lifting bed, using the adjustment 75 described above, according to the number of bales to be picked up. It is preferred that this adjustment be made prior to the pick-up operation, or at least before any bales are lifted onto the lifting bed and moved forwardly against the abutment 67.

To begin operation, the operator simply drives the vehicle to the area from which bales are to be gathered. With the cab in the forward centered position, the narrow cross-section of the vehicle, can be easily maneuvered along roadways and through standard gates to the field.

Once in the field, the operator may elect to swing the cab to the rearward position along side the primary frame and adjacent the bale pick-up 50. This is done by operating appropriate controls (not shown) to cause the pivot actuator cylinder 24 to extend. The extending cylinder 24 operates through linkage 25 to cause the cab 20 and supporting pivot frame 22 to swing about the axis of the pivot bearing to the rearward position. The cab and operator are now situated alongside the vehicle frame in clear view of the bale pick-up 50 (FIG. 6).

As the cab swings outwardly, the steering reverser valve actuator is operated to change the directional flow of steering fluid, effectively reversing the steering control. The operator is now able to steer the vehicle in the same manner as when the cab was facing forwardly.

Figure 6:
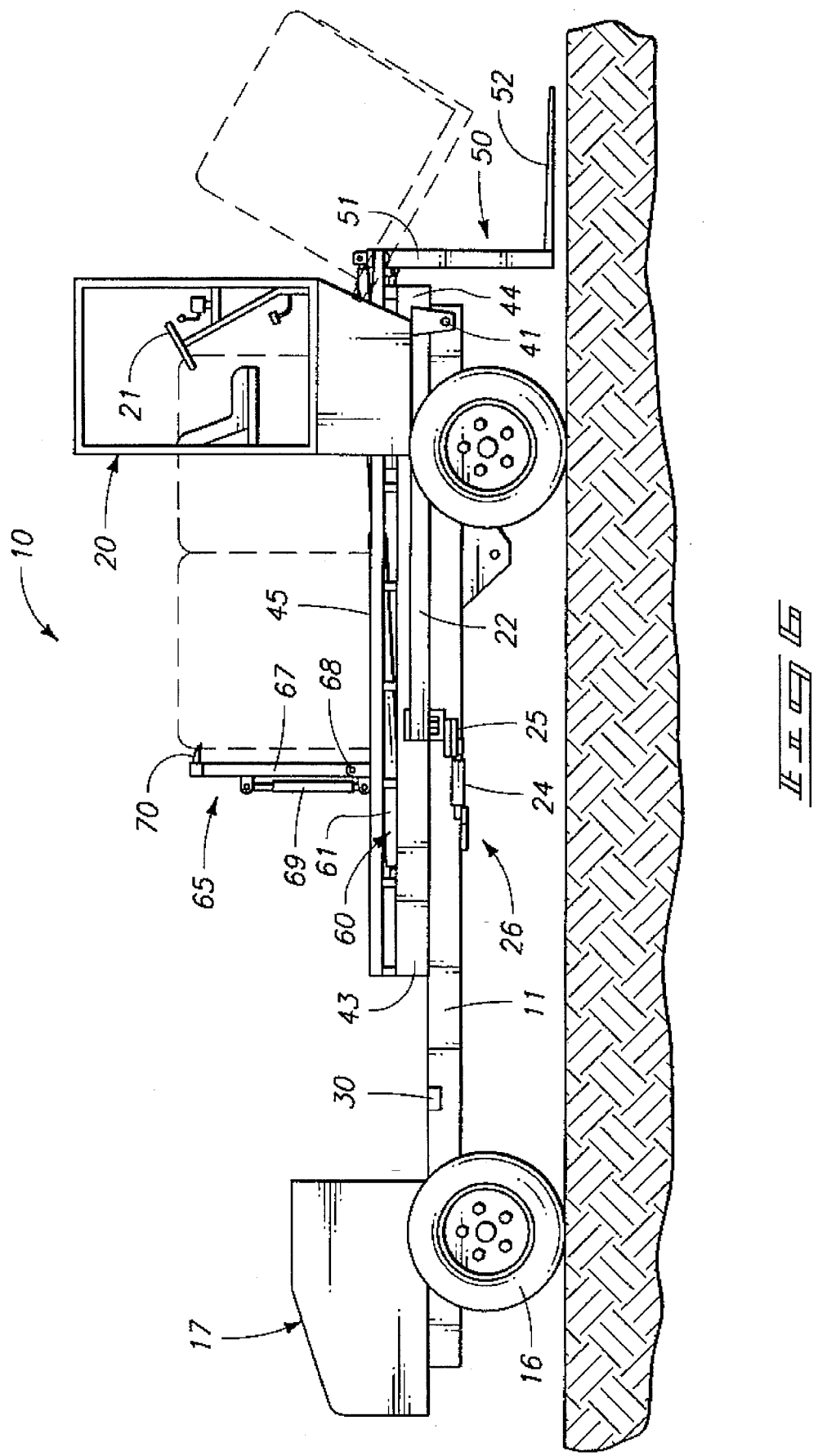
FIG. 6 is a side elevation view with the cab in the rearward position and with the bale pick-up in its first position, dashed lines being employed to show a bale being lifted toward others on the lifting bed.
Figure 15:
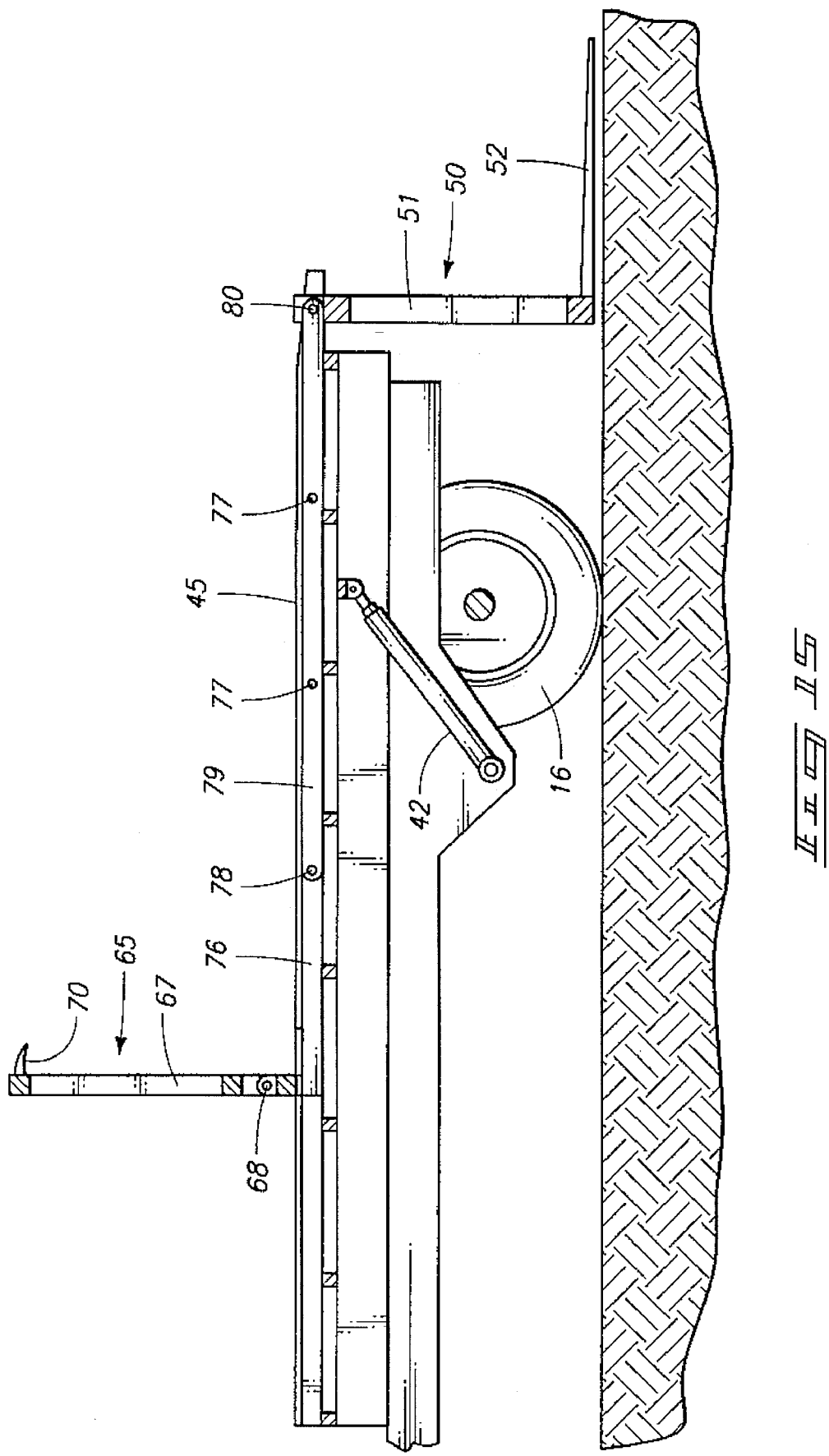
FIG. 15 is a longitudinal sectional view taken along line 15—15 in FIG. 3 showing connection of the squeeze frame and bale pick-up.

Now the bale pick-up 50 is actuated to lower the platform section 52 to the lowered, first position (FIGS. 6, 8). The vehicle may now be maneuvered to slide the platform section 52 under a bale.

When the bale is fully supported on the platform section 52, the pick-up driver is again actuated to lift the bale pick-up and the bale. The platform swings up and rearwardly as the cylinder 61 continues to retract to the second position (FIG. 9), delivering the bale to the lifting bed.

The operator may elect at this time to continue operating the bale pick-up driver 60 to move the bale pick-up 50 and engaged bale along the lifting bed 40 from the second to the third position (FIG. 10). As this happens, the bale is pushed forwardly along the bed 50 toward the bale squeezing frame 65. The bale is now fully supported on the lifting bed 40.

Next the operator actuates the bale pickup driver 60 to return the bale pickup to the first position, and the vehicle is moved to similarly engage and lift a subsequent bale. This process is repeated until a desired number of bales have been deposited on the lift bed. As the last bale is lifted, the bale pick-up may be left with the platform section 51 in the vertical position, against the last deposited bale to maintain the stack securely on the lifting bed 40.

The operator may now operate the appropriate controls to return the cab 20 to the forward position. As this happens, the steering reverser 30 is operated to again reverse flow of the steering fluid and again allow the operator to steer the vehicle in the normal fashion. The loaded vehicle may now be driven to a location where the bales on the lifting bed are to be stacked. Of course, the cab may be left in position, if so desired.

Before the operator approaches the stacking place, appropriate controls are again operated to return the cab to the rearward position. This again affords the operator a clear view to facilitate the stacking operation to follow. Steering is again automatically reversed as described above.

To stack the bales, the operator may first wish to actuate the squeezing frame 65, causing the abutment 67 to tilt rearwardly, firmly clamping the bales between the abutment and upright platform section 52. The spikes 70 pierce the adjacent bale to hold the row of bales securely as the lifting frame is pivoted to the substantially vertical position.

The lifting bed 40 is raised by selective operation of the lift drive 42. The lifting bed, the squeeze frame 65, and the bale pick-up all pivot upwardly, tipping the row of bales into a nearly vertical orientation (FIG. 4). The vehicle may now be maneuvered into position where the vertical row of bales are to be stacked.

To release the bales, the bale squeezing frame 65 is shifted back to release clamping pressure against the bales and to disengage the spikes 70. The bale pick-up driver 60 is now operated to slightly shift the bale pick-up 50 toward its first position. This causes the platform section 52 to be lowered against the ground surface, shifting the weight of the bales to the ground surface. The vehicle is then moved away from the bales, with the platform section sliding out from under the bottom bale. The vehicle may now be readied for another trip to the field to pick up more bales.

If the bales are to be deposited onto the bed of a trailer or truck, the operator simply tips the lifting bed up (FIG. 4) and controls the pick-up driver 60 to shift the elevation of the bales held between the squeeze frame 65 and platform section 52 (FIG. 7). This assures ample clearance for the bales and pick-up to be maneuvered over the truck bed (FIG. 7). It is noted that the squeezing frame 65 moves elevationally with the pick-up 50. This is due to the connection links 79 extending between squeezing frame 65 and bale pick-up 50. Once in position, the operator lowers the bale pickup and bale down onto the bed, then drives the vehicle away, leaving the bale on the bed surface.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A bale picker and stacker, comprising:

a wheel supported primary frame including a front end and a rearward end;

a lifting bed including a top bale receiving surface mounted to the primary frame for movement between a substantially horizontal position and a substantially vertical position;

a lift drive mounted between the lifting bed and primary frame for selectively moving the lifting bed between the substantially horizontal and vertical positions;

a bale pick-up movably mounted to the lifting bed, the bale pick-up having a leg section and an outwardly projecting platform section mounted to the lifting bed and moveable on the lifting bed between (a) a first position wherein the platform section is substantially parallel to and offset from the top bale receiving surface of the lifting bed and disposed toward the rear end of the primary frame, (b) a second position wherein the platform section is substantially perpendicular to the top bale receiving surface of the lifting bed, and (c) a third position wherein the platform section is substantially perpendicular to the top bale receiving surface of the lifting bed and disposed toward the front end of the primary frame from the second position; and a bale pick-up driver mounted between the bale pick-up and lifting bed and operable to move the bale pick-up between the first and third positions.

2. A bale picker and stacker, as claimed by claim 1 further comprising:

a control cab mounted to the primary frame for movement between a forward position facing forwardly at the front end of the primary frame and a rearward position facing rearwardly along side the rearward end of the frame.

3. A bale picker and stacker, as claimed by claim 1 further comprising:

a control cab mounted to the primary frame for movement between a forward position facing forwardly at the front end of the primary frame and a rearward position facing rearwardly along side the rearward end of the frame;

wherein the wheel supported primary frame includes steering wheels and a steering controller in the cab for selectively turning the steering wheels; and steering reverser operatively connected to the steering controller for reversing operation of the steering controller at one of the forward or rearward positions of the control cab.

4. A bale picker and stacker, as claimed by claim 1 wherein the primary frame includes side edges joining the front and rearward ends, and further comprising:

a control cab mounted to the primary frame for movement between a forward position facing forwardly at the front end of the primary frame between the side edges and a rearward position facing rearwardly and situated outwardly along side one of the side edges adjacent the rearward end of the frame.

5. A bale picker and stacker, as claimed by claim 1 further comprising:

a bale squeezing frame mounted to the lifting bed opposite to the bale pick-up and adjustable toward the bale pickup.

6. A bale picker and stacker, as claimed by claim 1 and further comprising:
  a bale squeezing frame mounted to the lifting bed opposite to the bale pick-up and adjustable toward the bale pickup; and
  bale engaging spikes projecting from the squeezing frame toward the bale pick-up.

7. A bale picker and stacker, as claimed by claim 1 further comprising:
  a bale squeezing frame including an abutment mounted to the lifting bed opposite to the bale pick-up and adjustable thereon toward and away from the bale pick-up; and
  a tilting mechanism on the squeezing frame for tipping the abutment on the squeezing frame toward the bale pick-up.

8. A bale picker and stacker, as claimed by claim 1 comprising:
  a bale squeezing frame including an abutment mounted to the lifting bed opposite to the bale pick-up and adjustable thereon toward and away from the bale pick-up;
  a tilting mechanism on the squeezing frame for tipping the abutment on the squeezing frame toward the bale pick-up; and
  bale engaging spikes projecting from the squeezing frame toward the bale pick-up.

9. A bale picker and stacker, as claimed by claim 1 further comprising:
  a bale squeezing frame including an abutment mounted to the lifting bed opposite to the bale pick-up;
  a tilting mechanism on the squeezing frame for tipping the abutment on the squeezing frame toward the bale pick-up; and
  an adjustment mounting the bale squeezing frame to the lifting bed for selective positioning along the lifting bed in relation to the bale pick-up.

10. A bale picker and stacker, as claimed by claim 1, further comprising a bale squeezing frame including an abutment mounted to the lifting bed forward of the bale pick-up; and
  a link connecting the bale squeezing frame to the bale pick-up for transmitting motion of the bale pick-up between the second and third positions to the bale squeezing frame.

11. A bale picker and stacker, as claimed by claim 1 wherein the leg section is substantially perpendicular to the platform section and further comprising rollers movably supporting the leg section on the lifting bed for movement between the first and second positions.

12. A bale picker and stacker, as claimed by claim 1 wherein the leg section is substantially perpendicular to the platform section and further comprising rollers mounting the leg section to the lifting bed for movement between the first and second positions; and further comprising:
  a pivot control mounted between the lifting bed and bale pick-up to control movement of the platform and leg sections substantially about a pivot axis between the first and second positions, and to permit movement of the platform and leg sections between the second and third positions.

13. A bale picking and stacking vehicle, comprising:
  a primary frame including a front end and a rearward end;
  wheels movably supporting the primary frame for movement along a ground surface, at least two of the wheels being steerable;
  a drive train on the primary frame and connected to the wheels for powering at least two of the wheels to move the vehicle along the ground surface;
  a control cab on the primary frame for supporting an operator and including a steering controller for operating the steerable wheels to control directional movement of the vehicle;
  a lifting bed including a top bale receiving surface mounted to the primary frame for movement between a substantially horizontal position and a substantially vertical position;
  a lift drive mounted between the lifting bed and primary frame for selectively moving the lifting bed between the substantially horizontal and vertical positions;
  a bale pick-up movably mounted to the lifting bed, the bale pickup having a leg section and an outwardly projecting platform section mounted to the lifting bed and moveable on the lifting bed between (a) a first position wherein the platform section is substantially parallel to and offset from the top bale receiving surface of the lifting bed and disposed toward the rear end of the primary frame, (b) a second position wherein the platform section is substantially perpendicular to the top bale receiving surface of the lifting bed, and (c) a third position wherein the platform section is substantially perpendicular to the top bale receiving surface of the lifting bed and disposed toward the front end of the primary frame from the second position; and
  a bale pick-up driver mounted between the bale pick-up and lifting bed and operable to move the bale pick-up between the first and third positions.

14. A bale picker and stacker, as claimed by claim 13 further comprising:
  a control cab mounted to the primary frame for pivotal movement between a forward position facing forwardly at the front end of the primary frame and a rearward position facing rearwardly along side the rearward end of the frame.

15. A bale picker and stacker, as claimed by claim 13 comprising:
  a control cab pivot driver mounted to the primary frame for shifting the control cab between a forward position facing forwardly at the front end of the primary frame and a rearward position facing rearwardly along side the rearward end of the frame; and
  a steering reverser operatively connected to the steering controller for reversing operation of the steering controller at one of the forward or rearward positions of the control cab.

16. A bale picker and stacker, as claimed by claim 13 wherein the primary frame includes side edges joining the front and rearward ends, and wherein the control cab is mounted to the primary frame for movement between a forward position facing forwardly at the front end of the primary frame between the side edges and a rearward position facing rearwardly and located outwardly along side one of the side edges adjacent the rearward end of the frame.

17. A bale picker and stacker, as claimed by claim 13 wherein the primary frame includes side edges joining the front and rearward ends, and wherein the control cab is mounted to the primary frame for movement between a forward position facing forwardly at the front end of the primary frame between the side edges and a rearward position facing rearwardly and located outwardly along side one of the side edges adjacent the rearward end of the frame, and further comprising:

a steering reverser operatively connected to the steering controller for reversing operation of the steering controller at one of the forward or rearward positions of the control cab.

18. A bale picker and stacker, as claimed by claim 13 further comprising:

a bale squeezing frame mounted to the lifting bed opposite to the bale pick-up and movable toward the bale pickup.

19. A bale picker and stacker, as claimed by claim 13 further comprising:

a bale squeezing frame including an abutment mounted to the lifting bed opposite to the bale pick-up and movable toward the bale pickup; and a tilting mechanism mounted on the squeezing frame and attached to the abutment for tipping the abutment toward the bale pick-up.

20. A bale picker and stacker, as claimed by claim 13 further comprising:

a bale squeezing frame including an abutment mounted to the lifting bed opposite to the bale pick-up and movable toward the bale pickup;

a tilting mechanism mounted on the squeezing frame and attached to the abutment for tipping the abutment toward the bale pick-up; and bale engaging spikes projecting from the squeezing frame toward the bale pick-up.

21. A bale picker and stacker, as claimed by claim 13 further comprising:

a bale squeezing frame mounted to the lifting bed opposite to the bale pick-up; and links joining the bale squeezing frame and pick-up for moving the bale squeezing frame along the lift frame responsive to movement of the pick-up frame between the second and third positions.

22. A bale picker and stacker, as claimed by claim 13 further comprising:

a bale squeezing frame mounted to the lifting bed opposite to the bale pick-up; and an adjustment between the bale squeezing frame and bale pick-up for selective positioning along the bale squeezing frame along the lifting bed in relation to the bale pick-up.

23. A bale picker and stacker, as claimed by claim 13 wherein the leg section is substantially perpendicular to the platform section and wherein the leg section is mounted by rollers on the lifting bed for movement between the first and third positions.

24. A bale picker and stacker, as claimed by claim 13 wherein the leg section is substantially perpendicular to the platform section and wherein the leg section is mounted by rollers on the lifting bed for movement between the first and second positions; and further comprising:

a pivot control mounted between the lifting bed and bale pick-up to control movement of the platform and leg sections about a pivot axis between the first and second positions, and to permit movement of the platform and leg sections between the second and third positions.

25. A bale picking and stacking vehicle, comprising:

a primary frame including a front end and a rearward end;

wheels movably supporting the primary frame for movement along a ground surface, at least two of the wheels being steerable;

a drive train on the primary frame and connected to the wheels for powering at least two of the wheels to move the vehicle along the ground surface;

a control cab on the primary frame for supporting an operator and including a steering controller for operating the steerable wheels to control directional movement of the vehicle;

wherein the primary frame includes side edges joining the front and rearward ends, and wherein the control cab is mounted to the primary frame for movement between a forward position at the front end of the primary frame between the side edges and a rearward position outwardly along side one of the side edges adjacent the rearward end of the frame;

a lifting bed including a top bale receiving surface mounted to the primary frame for movement between a substantially horizontal position and a substantially vertical position;

a lift drive mounted between the lifting bed and primary frame for selectively moving the lifting bed between the substantially horizontal and vertical positions;

a bale pick-up movably mounted to the lifting bed, the bale pickup having a leg section and an outwardly projecting platform section mounted to the lifting bed and moveable on the lifting bed between (a) a first position wherein the platform section is substantially parallel to and offset toward the ground surface from the top bale receiving surface of the lifting bed and disposed toward the rear end of the primary frame, (b) a second position wherein the platform section is substantially perpendicular to the top bale receiving surface of the lifting bed, and (c) a third position wherein the platform section is substantially perpendicular to the top bale receiving surface of the lifting bed and disposed toward the front end of the primary frame from the second position;

a bale pick-up driver mounted between the bale pick-up and lifting bed and operable to move the bale pick-up between the first and third positions; and a bale squeezing frame including an abutment, mounted to the lifting bed opposite to the bale pick-up; and a tilting mechanism mounted between the squeezing frame and lifting bed for tipping the abutment toward the bale pick-up.

26. A bale picker and stacker, as claimed by claim 25 further comprising:

a steering reverser operatively connected to the steering controller for reversing operation of the steering controller at one of the forward or rearward positions of the control cab.

27. A bale picker and stacker, as claimed by claim 25 further comprising:

an adjustment mounting the bale squeezing frame to the lifting bed for selective positioning in relation to the bale pick-up.

28. A bale picker and stacker, as claimed by claim 25, further comprising round bale racks mountable to the lifting bed and projecting upwardly therefrom to prevent round bales from rolling off of the lifting bed.

* * * * *